(12) United States Patent
Browne et al.

(10) Patent No.: US 8,888,136 B2
(45) Date of Patent: Nov. 18, 2014

(54) METHODS OF PREVENTING OR REDUCING THE EFFECTS OF ROOF IMPACT IN AUTOMOTIVE APPLICATIONS

(75) Inventors: Alan L. Browne, Grosse Pointe, MI (US); Hanif Muhammad, Ann Arbor, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 13/343,110

(22) Filed: Jan. 4, 2012

(65) Prior Publication Data

US 2012/0098244 A1 Apr. 26, 2012

Related U.S. Application Data

(63) Continuation-in-part of application No. 12/427,900, filed on Apr. 22, 2009, now Pat. No. 8,201,850, and a continuation-in-part of application No. 12/427,868, filed on Apr. 22, 2009, now Pat. No. 8,262,133, and a continuation-in-part of application No. 12/392,103, filed on Feb. 25, 2009, now Pat. No. 8,100,471.

(51) Int. Cl.
*B60R 22/00* (2006.01)
*B60K 28/14* (2006.01)
*B60R 21/00* (2006.01)
*B60N 2/02* (2006.01)
*B60R 21/13* (2006.01)
*B60N 2/427* (2006.01)

(52) U.S. Cl.
CPC ............. *B60R 21/13* (2013.01); *B60N 2/42736* (2013.01); *C08L 2201/12* (2013.01)
USPC ................... 280/801.1; 180/282; 296/68.1

(58) Field of Classification Search
CPC .. B60R 21/13; C08L 2201/12; B60N 2/42736
USPC ............... 280/801.1, 806, 807; 180/282, 274; 296/68.1
See application file for complete search history.

(56) References Cited

U.S. PATENT DOCUMENTS

| | | | | |
|---|---|---|---|---|
| 4,154,472 A * | 5/1979 | Bryll | | 296/68.1 |
| 5,492,368 A * | 2/1996 | Pywell et al. | | 280/806 |
| 6,086,097 A * | 7/2000 | Van Wynsberghe | | 280/748 |
| 6,821,895 B2 * | 11/2004 | Lin et al. | | 438/691 |
| 6,851,747 B2 * | 2/2005 | Swierczewski | | 297/216.19 |
| 7,258,347 B2 * | 8/2007 | Keefe et al. | | 277/628 |
| 7,309,104 B2 * | 12/2007 | Browne et al. | | 297/284.1 |
| 7,556,117 B2 * | 7/2009 | Browne et al. | | 180/274 |
| 7,604,081 B2 * | 10/2009 | Ootani et al. | | 180/282 |
| 7,644,799 B2 * | 1/2010 | Friedman et al. | | 180/282 |
| 7,686,120 B2 * | 3/2010 | Browne et al. | | 180/274 |
| 7,845,648 B2 * | 12/2010 | Keefe et al. | | 277/630 |
| 2006/0055214 A1 * | 3/2006 | Serber | | 297/216.1 |
| 2006/0175116 A1 * | 8/2006 | Friedman et al. | | 180/282 |
| 2008/0272259 A1 * | 11/2008 | Zavattieri et al. | | 248/311.2 |
| 2010/0280718 A1 * | 11/2010 | Hashimoto et al. | | 701/45 |

* cited by examiner

*Primary Examiner* — Faye M Fleming
*Assistant Examiner* — Joselynn Y Sliteris

(57) ABSTRACT

A method of autonomously preventing or reducing the affects of roof impact in automotive applications, including the steps of determining a vehicle condition indicative of an imminent roof impact, and modifying a vehicular seat or roof structure, or deploying a netting as a result thereof, wherein active material actuation is preferably utilized to effect the same.

9 Claims, 6 Drawing Sheets

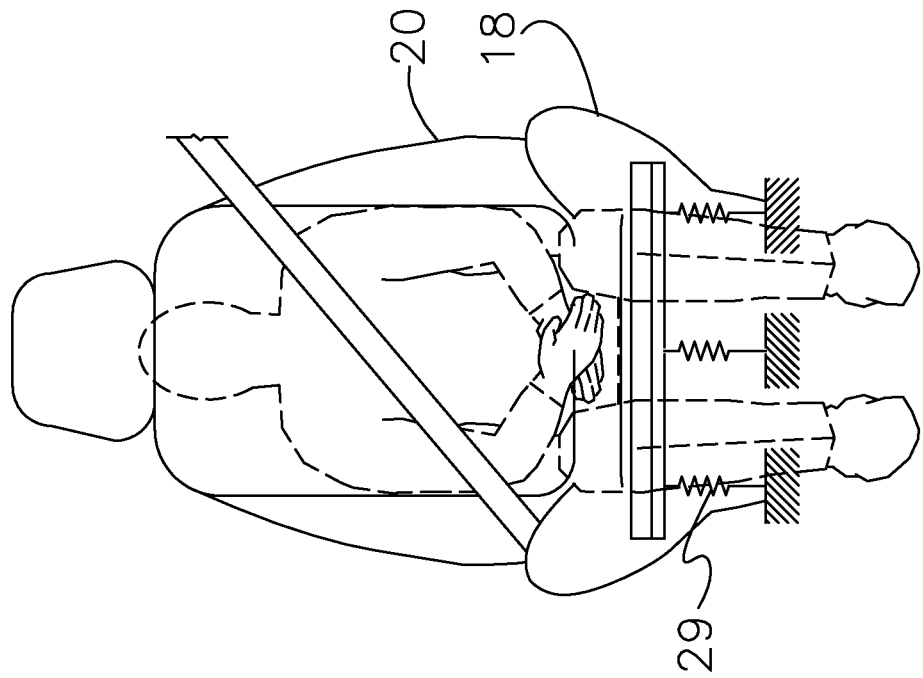
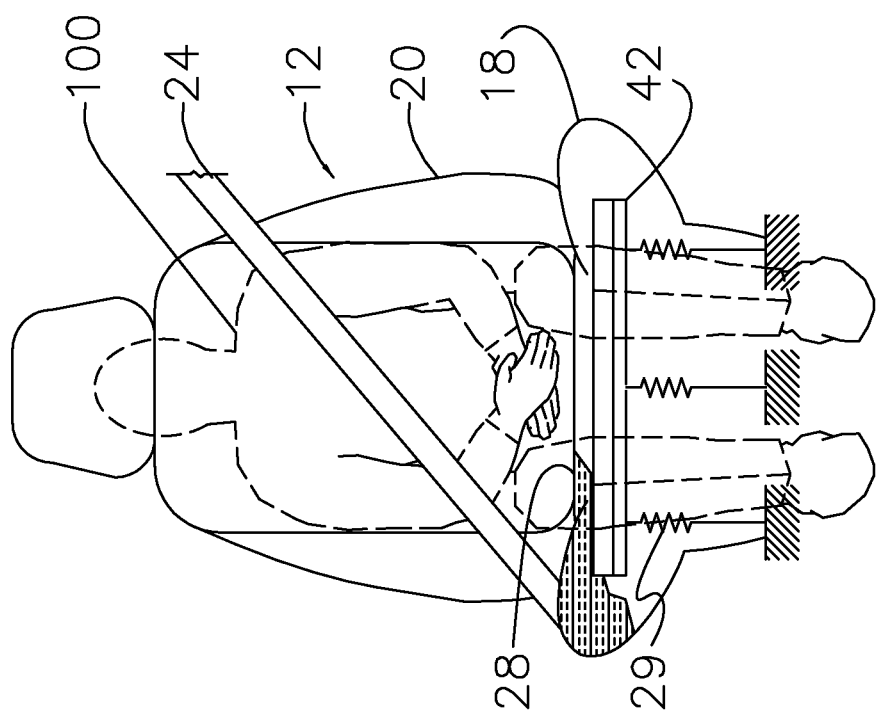
FIG. 3a
FIG. 3b

METHODS OF PREVENTING OR REDUCING THE EFFECTS OF ROOF IMPACT IN AUTOMOTIVE APPLICATIONS

CROSS-REFERENCES TO RELATED APPLICATIONS

This U.S. Non-Provisional patent application is a continuation-in-part and claims the benefit of U.S. Non-Provisional application Ser. No. 12/427,900 ("the '900 application") filed on Apr. 22, 2009, and entitled "ADJUSTABLE BELT TENSIONING UTILIZING ACTIVE MATERIAL ACTUATION", now U.S. Pat. No. 8,201,850; U.S. Non-Provisional application Ser. No. 12/427,868 ("the '868 application") filed on Apr. 22, 2009, and entitled "BELT RETRACTOR UTILIZING ACTIVE MATERIAL ACTUATION", now U.S. Pat. No. 8,262,133; and U.S. Non-Provisional application Ser. No. 12/392,103 ("the '103 application") filed on Feb. 25, 2009, and entitled "ADJUSTABLE SEAT RAMP UTILIZING ACTIVE MATERIAL ACTUATION", now U.S. Pat. No. 8,100,471, each of which is being incorporated by reference herein.

BACKGROUND OF THE INVENTION

1. Field of the Invention

The present application generally relates to methods of preventing or reducing the effects of roof impact in automotive applications, and more particularly, to methods of autonomously and selectively doing the same, so as to mitigate, for example, consequences to vehicle occupants during rollover events.

2. Discussion of Prior Art

In the automotive arts, head to roof clearance and passenger kinematics during rollover events are important factors to be considered when balancing aerodynamics and safety. To that end, various test setups and analytical simulations with complete, partial or roll-caged vehicles have been developed to understand and assess consequences to passengers during rollover or "trip-over" events, wherein 'trip-over' is defined by the National Automotive Sampling System (NASS) as a rollover event caused by the sudden stopping of the lateral motion of a vehicle (North American Engineering Standards, GM Document GMN517TP). Trip-over events may be produced, for example, by accidentally or improperly encountering a curb, pothole, pavement/soil anomaly, or other vehicle. It is well appreciated that these events present various concerns relating to the safety of passengers. For example, during an impact between the head of a passenger and the roof of the vehicle, the neck may experience inertial load from the torso, as well as undesirable bending, torsion, and shear. The severity of this event increases significantly when the roof of the vehicle is completely or partially pressed against the ground.

Conventional vehicles typically present adjustable seats that offer the passenger the ability to manually adjust head clearance to his or her satisfaction; but they generally offer no means for autonomously adjusting head clearance, or otherwise altering the ability of the passenger to impact the roof, where a vehicular condition indicative of an imminent roof impact merits. That is to say, current vehicles offer fixed and passive responses to meet automotive standards, which are not tunable to address roof impacts due to rollover and similar events in real-time.

BRIEF SUMMARY

Responsive to these and other concerns, the present invention provides novel methods of preventing or reducing the effects of roof impact by automobile passengers. The invention is projected, on the basis of simulation only, to be useful for increasing the safety of vehicle occupants during rollover and similar events. More particularly, the various methods introduced herein may be useful for reducing variously compression, bending, torsion and shear loads in the neck during a rollover event. Where active materials are utilized, the invention is further useful for implementing the advantages afforded thereby, including but not limited to, reduced noise (both with respect to noise and EMF), reduced complexity, increased efficiency, and reduced weight and packaging requirements. The invention provides responsive seat designs, roof structures, and other load carrying vehicular systems, including but not limited to active material-based devices that demonstrate tunable characteristics in real time. That is to say, the invention is yet further useful for providing a real-time response directed at avoiding or minimizing roof impact consequences to occupants.

What is claimed is a method adapted for use by a vehicle comprising a roof, and seat, and by an occupant disposed within the seat. In a first aspect, the method includes the steps of determining a vehicle condition indicative of an imminent roof impact, autonomously modifying the seat, in response to determining the condition, and preventing or reducing the effects of the roof impact, as a result of autonomously modifying the seat. Various exemplary ways of modifying the seat to that end are further claimed. In another aspect of the invention, a netting is deployed as a result of determining the imminent impact condition, and finally, in yet another aspect, a structure connected to the roof, such as a telescoping pillar, or roof rack, is modified in response to the condition.

The above described and other features, including various sensor based and situational based methods, are exemplified by the following figures and detailed description.

BRIEF DESCRIPTION OF THE DRAWINGS

Preferred embodiments of the invention are described in detail below with reference to the attached drawing figures, wherein:

FIG. 3a is a front elevation of a passenger sitting in a seat comprising an active seat base, and seat belt, in a normal or raised condition, in accordance with a preferred embodiment of the invention;

FIG. 3b is a front elevation of the passenger and seat shown in FIG. 3a, wherein the seat base has been modified, and the passenger caused to sink within the seat cushion;

DETAILED DESCRIPTION

Figure 1:
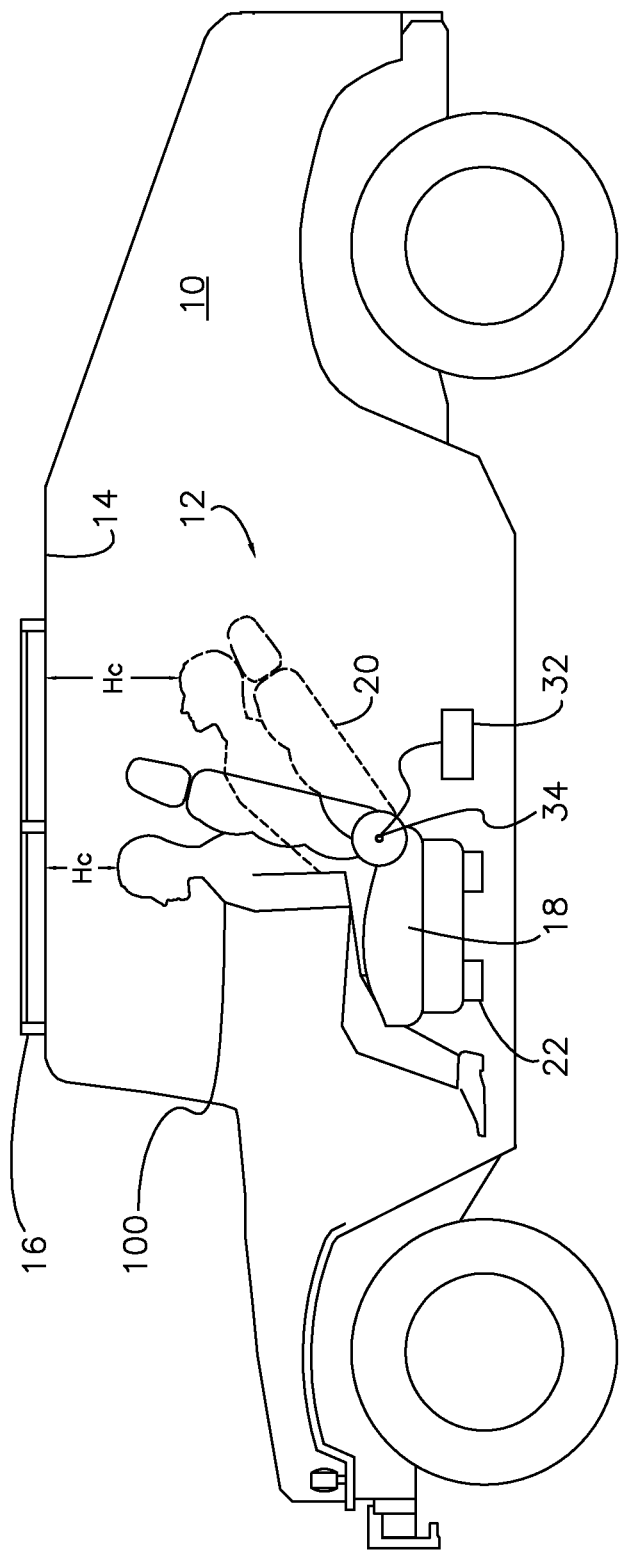
FIG. 1 is an elevation of a vehicle including a seat, roof, structure connected to the roof, and a passenger disposed within the seat, wherein the seat is in a first condition prior to determining a condition indicative of an imminent roof impact, and a second condition (shown in hidden line type) post condition determination, in accordance with a preferred embodiment of the invention.

Referring to FIGS. 1-7b, various methods for preventing and/or reducing the effects of roof impact on occupants in automotive applications are presented. The invention is particularly suited to address rollover or "trip-over" crash events; however, it is certainly within the ambit of the invention to apply the advantages thereof in other settings or instances. For example, the various methods may be executed to increase passenger comfort where a low clearance condition is determined from a comparison of the actual head clearance, Hc (FIG. 1), and a minimum threshold, or in anticipation of encountering an unsuspecting speed bump or other hazard. Devices and means, including but not limited to active material-based devices and mechanisms, to mitigateconsequences to occupants in rollover and other similar events are disclosed herein.

As used herein the term "active material" is defined as any of those materials or composites that exhibit a reversible change in fundamental (i.e., chemical or intrinsic physical) property when exposed to or precluded from an activation signal. Suitable active materials include, without limitation, shape memory alloys ("SMAs"; e.g., thermal and stress activated shape memory alloys and magnetic shape memory alloys (MSMA)), electroactive polymers (EAPs) such as dielectric elastomers, ionic polymer metal composites (IPMC), piezoelectric materials (e.g., polymers, ceramics), and shape memory polymers (SMPs), shape memory ceramics (SMCs), baroplastics, magnetorheological (MR) materials (e.g., fluids and elastomers), electrorheological (ER) materials (e.g., fluids, and elastomers), and combinations comprising at least one of the foregoing active materials. Depending on the particular active material, the activating condition can take the form of an activation signal, which can be, without limitation, an electric current, a temperature change, a magnetic field, a chemical activation signal, a mechanical loading or stressing, and the like.

When the active material is exposed to an activating condition, the active material undergoes a change in a property. The changed property can be, without limitation, a shape change, a shape orientation change, a phase change, a change in modulus, a change in strength, a change in dimension, or any combination of the foregoing. The resultant change in property of the active material produces a change in an impedance characteristic of the system or serves to actuate a device, mechanism, or system as further described herein, as such the term "actuator" shall not be used in a limiting sense, and shall include impedance modifying components. Such a change in a compliance characteristic can be, without limitation, a stiffness change, a damping capability change, a yield strength change, a change in force-deflection behavior, a change in load-carrying capacity, a change in energy absorption capacity, any combination of the foregoing, and the like.

Exposing the active material to an activating condition can be done in various ways. An activation device can be used to transmit an activation signal, e.g., a thermal signal, to the active material. The activation device may incorporate sensors which could trigger the activating condition in response to a predetermined event, current or anticipated changes in the operating environment, or allow direct activation of the material though user input. Such an active system could also provide the option of a feedback loop where monitoring the degree of material transformation, geometrical change, and structure integrity of the load bearing structure is possible. Inclusive of this feedback, an overload protection mechanism (not shown) may be provided as disclosed in the '103 application.

Another example using both passive and active systems could include a passive system to precondition an active material element and an active system to fully activate the active material. As used herein, the term "precondition" generally refers to minimizing the remaining amount of energy required to effect actuation.

Shape memory alloys generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be pseudo-plastically deformed and upon exposure to some higher temperature will transform to an Austenite phase, or parent phase, and return, if not under stress to their shape prior to the deformation.

Shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Thus, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite phase transformation, and the material will recover the original, annealed shape. Hence, one-way shape memory effects are only observed upon heating. Active materials comprising shape memory alloy compositions that exhibit one-way memory effects do not automatically cycle with temperature changes back and forth between two shapes, and require an external mechanical force to deform the shape away from its memorized or taught geometry.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effect are composite or multi-component materials. They combine an alloy that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their phase transition temperature. It is appreciated that where the SMA is one-way in operation, a biasing force return mechanism (such as a spring) would be required to return the SMA to its starting configuration. Finally, it is appreciated that Joule heating can be used to make the entire system electronically controllable.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material above the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone)dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require their temperature to be above the glass transition temperature of their constituent that has a lower glass transition temperature, i.e. a continuous power input in a low temperature environment to remain in their lower modulus state.

As shown in FIG. 1, the inventive method is adapted for use with a vehicle 10 comprising at least one "seat" or seat system 12 having securely disposed therein a passenger 100, and further comprising a roof 14, and adjacent structure 16 physically connected to the roof 14. The inventive method selectively and autonomously modifies at least one of these vehicular components in response to the autonomous determination of a vehicular condition indicative of an imminent roof impact.

Figure 1A:
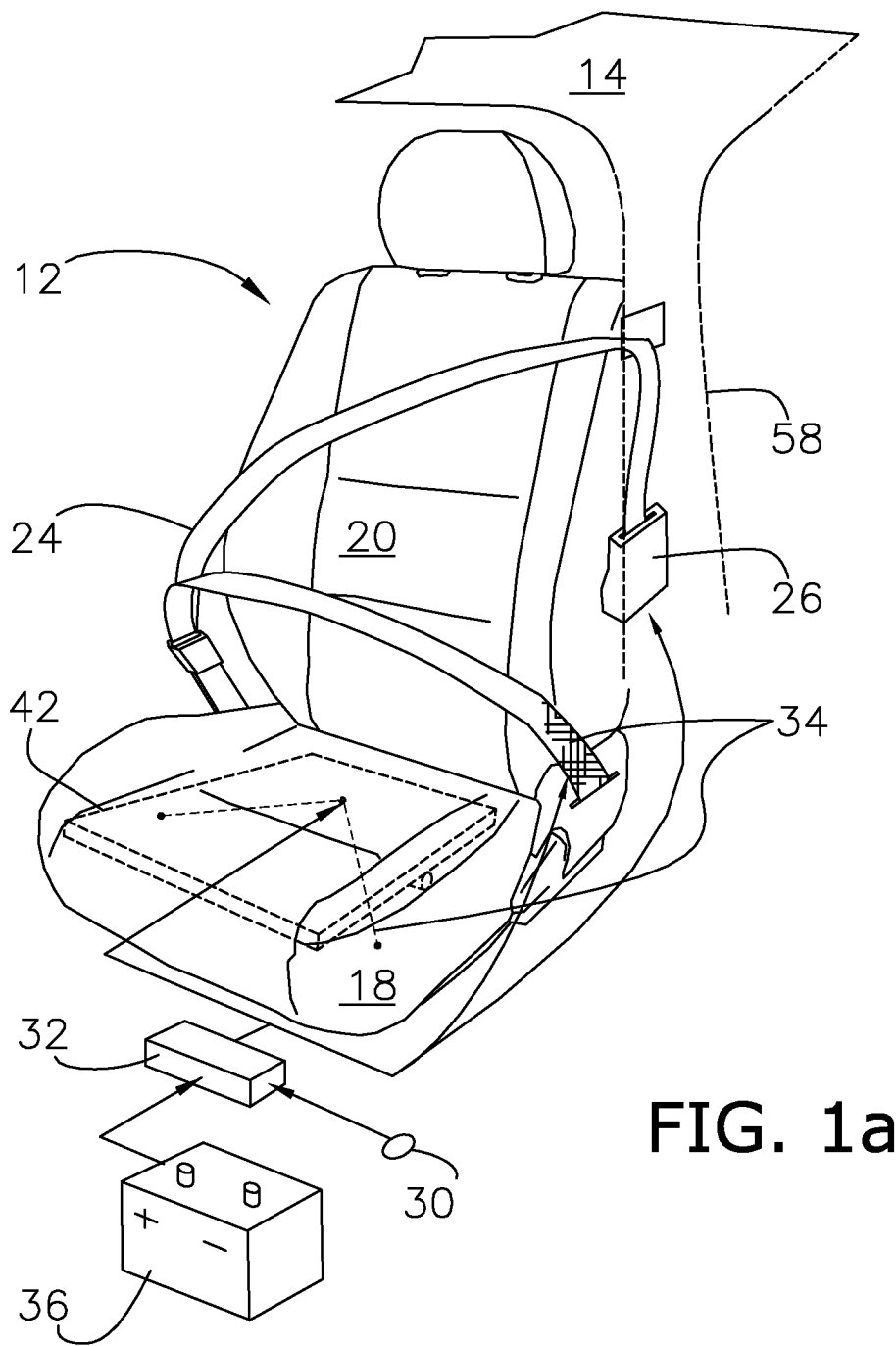
FIG. 1a is a perspective view of a vehicular seat, controller, sensor, and signal source, wherein the seat further includes a modifiable base, upright, belt, and pretensioner, each communicatively coupled to the controller, in accordance with a preferred embodiment of the invention.

More particularly, the seat system 12 consists of a base 18, upright 20, supportive mounts 22 or otherwise attachment to the floor, a seat belt 24, belt attachments (e.g., D-ring clasp, buckle, retractor, etc.), and a belt pretensioner 26, as appreciated and understood by those of ordinary skill in the art (FIGS. 1 and 1a). The seat base 18 and upright 20 further comprise a cushion 28 and seat frame, including supporting spring assembly 29, supportive of the cushion 28 (FIGS. 3a, b). Any of these components may be selectively modified, so as to increase head clearance, prevent passenger excursion towards the roof during rollover events, or alter the energy absorption capacity of the roof 14 or seat 12, consistent with the teachings herein.

The vehicle 10 further includes at least one roll sensor (e.g., gyroscopic rate sensors) 30 or other sensor(s) that individually or cooperatively function to determine a vehicle condition indicative of an imminent roof impact, such as an actual rollover event (FIG. 1a). A controller 32 is communicatively coupled to the sensor(s) 30 and programmably equipped to execute the inventive method. The sensor(s) 30 and controller 32 are cooperatively configured to detect or anticipate a rollover event, or an otherwise imminent roof impact state. In each of the seat modification methods described below, the sensor(s) 30 and controller 32 are preferably further configured to initially determine the presence of a passenger 100 within the associated seat 12, and withhold execution where passenger presence is not determined.

The modifications variously described below are caused when an actual rollover event is determined, or alternatively, where the rollover event is anticipated or predicted based on at least one vehicular condition, including, for example, video feedback, or tracking data indicating a vehicle lane change onto a sloped embankment or curb. It is appreciated that, where anticipatory, fully executing the method is preferably controlled so as not to impact the driver's ability to perform an avoidance maneuver. That is to say, modification to the driver's seat is preferably delayed until the actual rollover event (e.g., no load on the driver side wheels) is detected. It is certainly within the ambit of the invention to utilize pneumatic, hydraulic and/or electro-mechanical driven means, such as conventional power adjustment seats, to autonomously effect the modifications described herein; more preferably, however, active material actuation is utilized to effect the afore-mentioned advantages.

Figure 2B:
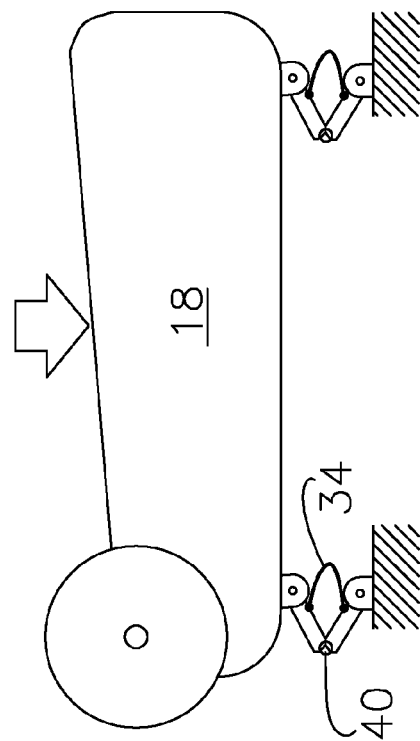
FIG. 2b is an elevation of the base shown in FIG. 2a, wherein the active material has been activated, the mounts have collapsed, and the base is in a lowered condition.
Figure 2A:
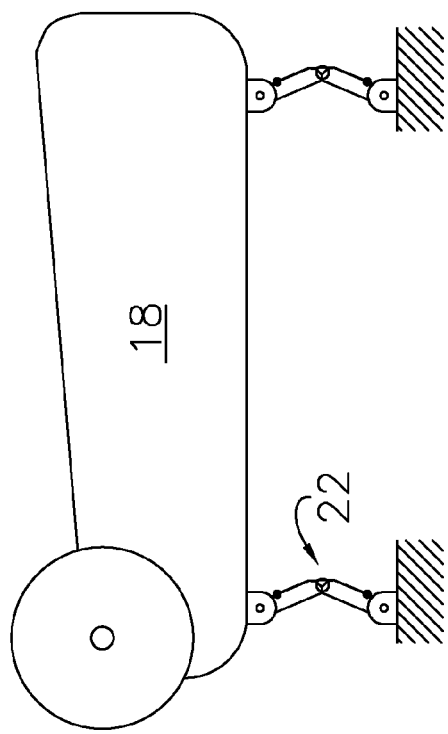
FIG. 2a is an elevation of a vehicular seat base having active material driven adjustable mounts, wherein the base is in a raised condition, in accordance with a preferred embodiment of the invention.

In a first embodiment, the seat mounts 22 are caused to soften or become collapsible, so that the seat 12 is pulled towards the floor of the vehicle 10 under the passenger load. As further disclosed in the '103 application, the preferred mounts 22 are drivenly coupled to active material actuators or elements 34, such as the shape memory (e.g., SMA) wires shown in FIGS. 2a,b. Where active material actuation is employed, the vehicle 10 further includes an activation signal source 36 (e.g., the charging system of the vehicle 10) communicatively coupled to the actuator 34 through the controller 32 (FIG. 1a). In FIGS. 2a,b, activation of the actuator 34 causes them to contract, and the bi-stable mounts 22 to swing past their neutral axes. Though stable in a generally upright condition when right of the axis (FIG. 2a), the mounts 22 are configured to achieve substantially (greater than 25%) collapsed, and more preferably completely (greater than 75%) collapsed conditions when left of the axis (FIG. 2b). A latch or locking mechanism 38 (FIG. 4) is preferably provided to retain the mounts 22 in the collapsed condition during the rollover event; and a return spring 40 (also shown in FIG. 4) operable to return the mounts 22 to the right or upright condition is caused to store energy under the passenger load. After use, the method may be reset by releasing the latches 38 and allowing the stored energy in the springs to be released.

Alternatively, the associated pretensioner 26 may be energized (prior to crash detection) to function concurrently with mount modification. Here, it is appreciated that the seat belt 24 will be caused to rapidly re-establish a secure relationship between the seat 12 and passenger 100, and retain the seat base 18 in the lowered condition. It is appreciated that other examples of active material activated mounts 22, such as those disclosed in the '103 application, may be equally employed in the inventive method. For example, in a one-time use, it is appreciated that a piezoelectric actuator may be employed to pull a pin that results in mount modification.

In another embodiment, the seat base 18 is operable to selectively modify its rigidity or stiffness, so as to enable the passenger 100 to sink further into the seat 12 under the passenger load. As a result, it is appreciated that head clearance is increased (compare FIGS. 3a,b). This may be accomplished in various ways. First, an advanced system of mechanisms and actuators, including but not limited to active material-based actuators, may be used to disconnect the seat cushion 28 from its supporting spring assembly 29 prior to energizing the pretensioner 26. In another example, the seat base 12 may comprise an internal bladder (not shown) and fluid source communicatively coupled thereto via a valve (also not shown), wherein the bladder is normally pressurized to support the passenger 100, but caused to expel fluid under the passenger load, upon determination of the vehicular condition, by opening the valve. Consequently, the passenger 100 sinks as a result of modifying the rigidity of the cushion 28, and head clearance is increased. Again, the pretensioner 26 may be automatically caused to re-tension the belt 24 against the passenger 100, so as to lock-in the newly achieved lowered condition.

Other methods include activating one or more SMP springs of the supporting spring assembly 29 disposed within the base 18, so that they achieve their lower modulus state (FIGS. 3a,b). The SMP springs are able to support the passenger load only in the high modulus state. More preferably, where SMP springs are employed, it is appreciated that the springs present first and second k-values, $K_1$ and $K_2$, reflecting activated and deactivated states respectively. $K_1$ is less than anticipated passenger loads, while $K_2$ is not. Where deformed (e.g., compressed) under passenger loading in the low modulus state, it is appreciated that further activation may be used to return the SMP springs back to their normal configuration, once loading is ceased.

Figure 4:
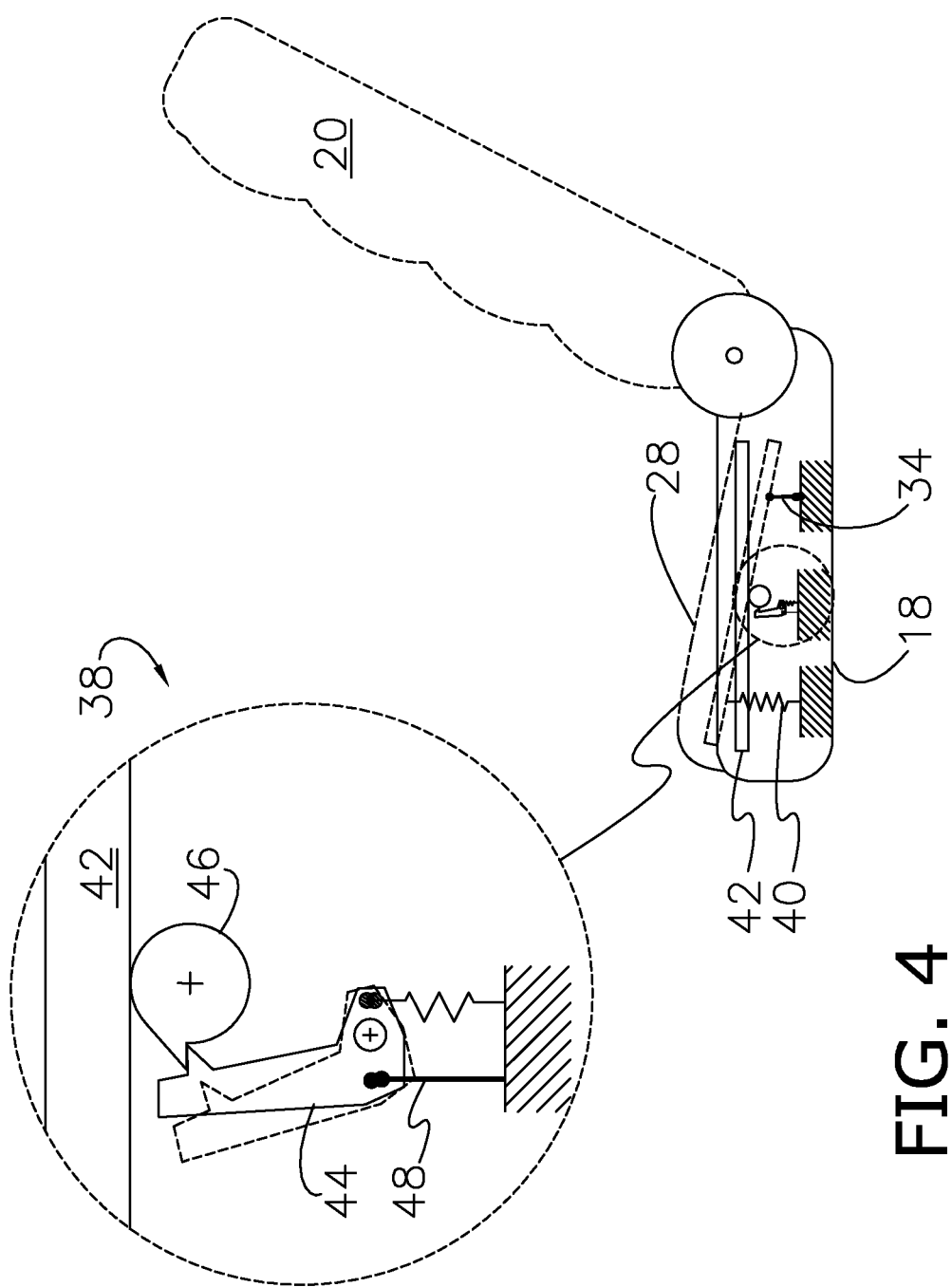
FIG. 4 is an elevation of a vehicular seat including a seat base having a manipulable seat ramp or pan and active material actuator disposed therein, particularly illustrating an active material release mechanism in enlarged caption view, in accordance with a preferred embodiment of the invention.

Similarly, and as shown in FIG. 4, a seat pan or ramp 42 disposed within the base cushion 28 may be manipulated when an imminent roof impact is determined, so as to cause the passenger 100 to submerge towards the floor of the vehicle 10. Where the ramp 42 has been modified to the lowered condition (shown in hidden line type in FIG. 4), and head clearance increased, the pretensioner 26 may be energized to re-tension the belt 24 against the passenger 100, so as to lock-in the lowered condition. Alternatively, or in addition to energizing the pretensioner 26, a latch or locking mechanism 38 may be configured to engage the ramp 42 in the lowered condition, as shown. As illustrated, the latch 38 may include a spring-biased pawl 44 and cam 46 pivotally coupled to the pivot axis of the ramp 42 (FIG. 4). The pawl 44 is configured to slidingly engage and catch the cam 46 as the ramp 42 swings to the lowered condition, such that rotation in the opposite direction is prevented. A separate active material actuator (e.g., SMA wire) 48 is drivenly coupled to the pawl 44, so as to enable its release from the cam 46 on-demand.

In yet another embodiment, upon determining a vehicular condition indicative of an imminent roof impact, the seat-upright 20 is pivoted to a more horizontal orientation in the backward direction, so as to increases head clearance (FIG. 1). Again, it is appreciated that conventional power adjustment systems may be employed, where programmably configured accordingly. More preferably, however, active material actuation is employed. For example, a ratcheting SMA torque tube, which is an example of the actuator 34, may be pivotally coupled to the upright 20, and operable to modify the reclining angle defined by the upright 20 and base 18, when activated. In addition to or in lieu of this provision, the seat 12 may be further modified to present a "break-away" joint, wherein the resistance of the upright 20 to pivoting is substantially decreased. That is to say, when an imminent roof impact is determined, a mechanism or device communicatively coupled to the pivot axis defined by the base 18 and upright 20 and operable to retain the upright in the desired orientation, may be actuated to reduce the resistance to pivoting offered by the joint. Again, active material actuation is preferably employed to that end. For example, a joint comprising an SMP torsion spring may be configured such that activating the SMP weakens the joint. In its low modulus state, the upright 20 will give under passenger loading upon roof impact. Other configurations involving active shearing fluids, and retracting collars may be implemented as well.

Figure 5:
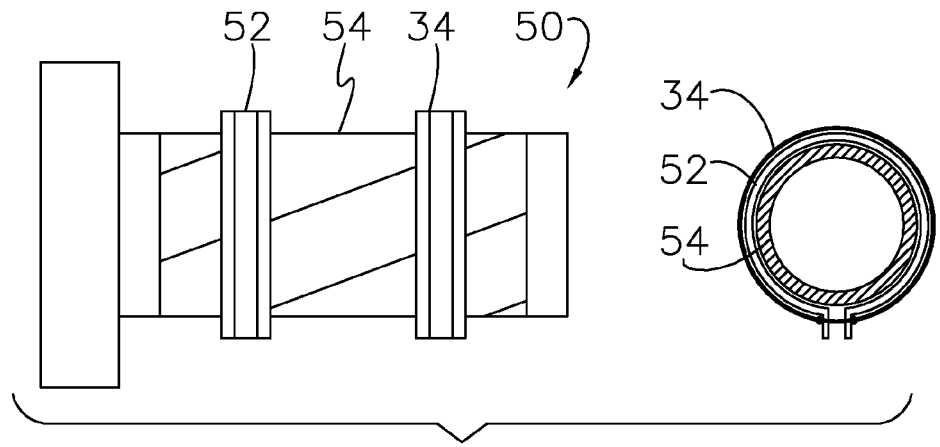
FIG. 5 is an elevation of a seat belt retractor employing active collars that adjustably engage a torsion drum, in accordance with a preferred embodiment of the invention.
Figure 6:
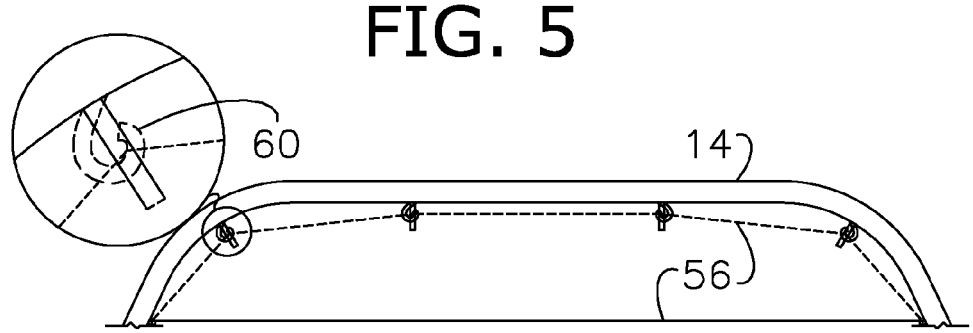
FIG. 6 is a partial elevation of a vehicle, including the roof, pillars supporting the roof, and an elastic netting shown in storage (hidden line type) and deployed conditions, in accordance with a preferred embodiment of the invention.

As previously mentioned, the pretensioner 26 and/or belt retractor 50 may be selectively modified to influence the tension in the belt 24 and otherwise lock the passenger 100 and seat base 18 in a lowered condition. With respect to the belt retractor 50, for example, at least one active material collar 52 may be employed to variably clasp an inner drum 54 (FIG. 5). Here, the degree of force and slippage between the collar 52 and drum 54 determines the amount of retraction force imparted upon and therefore tension within the belt 24. More preferably, in each method described, the retractor 50 is modified so as to lock the belt 24. It is appreciated that the other examples of active material modified retractors 50 disclosed in the '868 application may be equally employed in the inventive method, where suitable accommodations are made. Moreover, it is also appreciated that the belt 24 itself may be modified (e.g., shortened, stiffened, etc.), again preferably through active material actuation as shown variously in the '900 application to effect a change in tension therein. The pretensioner 26, active belt 24, and retractor 50 may be combined to redundantly or cooperatively retain the passenger 100 in a secured relationship relative to the seat 12.

In another aspect of the invention, roof impact is prevented and/or mitigated by deploying a drop down netting 56 preferably from structure 16 adjacent the roof 14 (FIG. 6) or from the roof 14 itself. More particularly, the netting 56 may be stored within and deployed from the headliner of the vehicle 10, or compose a side airbag system (not shown). The netting 56, once deployed, hinders access to the roof 14 or otherwise holds the passenger 100 in a sideway posture that mitigates consequences during rollover events. For example, the netting 56 may present an elastic composite pinned within the interior lining of the roof 14 and anchored at the "A", "B", and/or "C" pillars 58. A series of active (e.g., two-way SMA) pins 60, communicatively coupled to the controller 32 via hardwire, may be used to hold the netting 56 in an underlying relationship with the interior liner of the vehicle 10. Once the pins 60 are actuated, so as to be caused to shift from a retaining hook to a straightened profile, the netting 56 releases its energy, snapping back to an unstretched, horizontal configuration (compare hidden and continuous line-types in FIG. 6). In the deployed condition, the netting 56 extends across the interior cabin intermediate the passenger 100 and roof 14, and provides an energy-absorbing barrier that substantially prevents passenger excursion towards the roof 14.

Figure 7A:
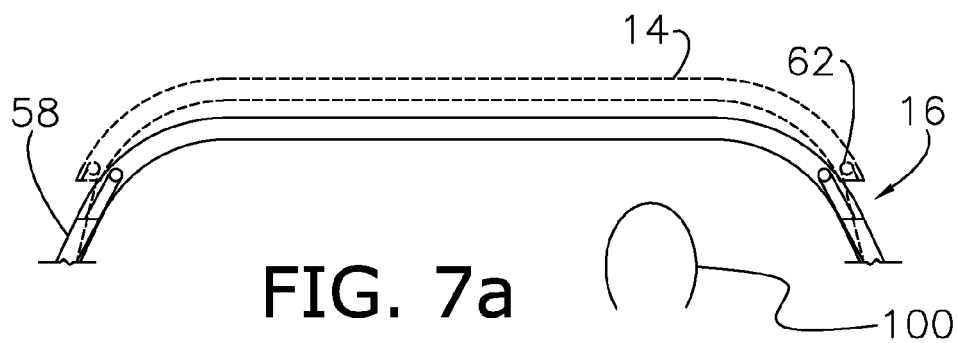
FIG. 7a is a partial elevation of a vehicle, including a roof, and telescoping pillars supporting the roof, in accordance with a preferred embodiment of the invention.
Figure 7B:
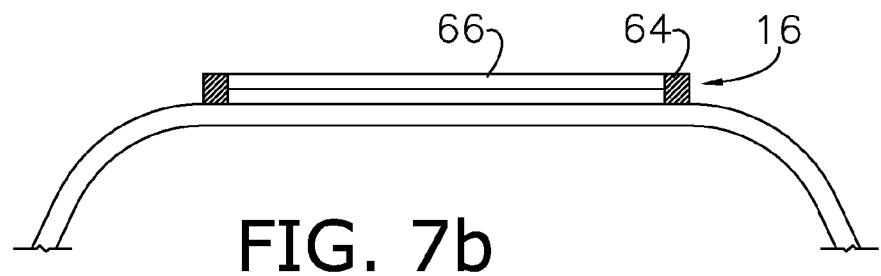
FIG. 7b is a partial elevation of a vehicle, including a roof, and a modifiable roof rack attached thereto, in accordance with a preferred embodiment of the invention.

In yet another aspect of the invention, structure 16 adjacent the roof 14 may be modified to selectively raise the roof 14 prior to or during a rollover event (FIG. 7a). For example, when a vehicle condition indicative of an imminent roof impact is determined, telescopic devices 62 mounted in bifurcated pillars or roll bars 58 may be activated to raise the roof 14 connected thereto. The pillar parts may be entrained via tracks (not shown) to guide translation, and latches or detents (also not shown) may be provided to snappingly retain the roof 14 in the raised condition. Thus, by raising the roof 14 head clearance is increased; the increased height and raised center of gravity reduces the ability of the vehicle 10 to roll; and the consequences due to roof impact, should a rollover event occur, are mitigated. More preferably, the devices 62 may also employ active material actuation to effect translation as proposed. For example, pyrotechnic activation of an SMA actuator (e.g., cable) 34 drivenly coupled to the pillars 58 (FIG. 7a), or an SMA release (not shown) communicatively coupled to a stored energy source (e.g., compressed spring) may be configured to effect the rapid response necessary.

Similarly, where the structure 16 is external to the roof 14, comprising, for example, a roof rack (FIG. 7b), selective modification may be used to increase the height of the vehicle 10, and/or energy absorption capacity of the roof 14. An active roof rack 16 suitable for use in this method may comprise at least one normally Austenitic SMA member 64 that is passively activated by the stress loads encountered during the rollover event, and/or at least one SMP member 66 that is actively activated by the controller 32 to achieve a more collapsible or deformable lower modulus state. It is appreciated that the hysteresis loop of the SMA member 64 generated as it transforms from Austenitic to Martensitic and back to the Austenitic phase, due to the rollover event, results in energy absorption and therefore roof impact mitigation.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

The terms "a" and "an" herein do not denote a limitation of quantity, but rather denote the presence of at least one of the referenced item. The suffix "(s)" as used herein is intended to include both the singular and the plural of the term that it modifies, thereby including one or more of that term. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A method adapted for use by a vehicle comprising a roof and a seat, and by a passenger disposed within the seat, and for autonomously preventing or reducing the effects of an impact between the passenger and the roof, said method comprising:
   a. determining a vehicle condition indicative of an imminent roof impact;
   b. in response to determining the condition, activating a shape memory active material actuator in a non-contracted condition that holds a bi-stable mount in an upright condition, thereby causing the shape memory active material actuator to contract and release the bi-stable mount so that the bi-stable mount swings past a neutral axis and achieves a collapsed condition, whereby the seat is autonomously modified to a lowered condition; and
   c. preventing or reducing the effects of the roof impact, as a result of autonomously modifying the seat.

2. The method as claimed in claim 1, wherein step a) further includes sensing a rollover event by a sensor of the vehicle.

3. The method as claimed in claim 1, wherein step a) further includes anticipating a rollover event by the vehicle, as a result of determining the condition.

4. The method as claimed in claim 1, wherein step a) further includes determining a head clearance between the passenger and the roof, and comparing the clearance to a minimum threshold, so as to determine a low clearance condition, and wherein step b) increases the clearance.

5. The method as claimed in claim 1, wherein the bi-stable mount interconnects a seat base and a remainder of the vehicle.

6. The method as claimed in claim 1, wherein the seat further includes a seat belt restraining the passenger within the seat, and presenting a tension, and step b) further includes modifying the tension to re-establish a secure relationship between the seat and the passenger when the seat is in the lowered condition.

7. The method as claimed in claim 6, wherein step b) further includes modifying the belt.

8. The method as claimed in claim 6, wherein the seat further includes a belt retractor and pretensioner, both drivenly coupled to the belt, and step b) further includes modifying the retractor, energizing the pretensioner, or modifying the retractor and energizing the pretensioner.

9. The method as claimed in claim 1, wherein step a) further includes an initial step of determining a presence of the passenger with in the seat.

* * * * *